L. JANOT.
CINEMATOGRAPH.
APPLICATION FILED SEPT. 12, 1918.

1,357,566.

Patented Nov. 2, 1920.
2 SHEETS—SHEET 2.

Inventor
Louis Janot
by Attorney
his Attorney

UNITED STATES PATENT OFFICE.

LOUIS JANOT, OF VINCENNES, FRANCE, ASSIGNOR TO COMPAGNIE GENERALE DES ETABLISSEMENTS PATHE FRERES, PHONOGRAPHE ET CINEMATOGRAPHE, OF PARIS, FRANCE.

CINEMATOGRAPH.

1,357,566.      Specification of Letters Patent.      Patented Nov. 2, 1920.

Application filed September 12, 1918. Serial No. 253,677.

*To all whom it may concern:*

Be it known that I, LOUIS JANOT, citizen of the Republic of France, residing at 30 Rue des Vignerous, Vincennes, Seine, in the Republic of France, have invented new and useful Improvements in Cinematographs, of which the following is a specification.

This invention relates to apparatus for taking cinematographic views and has for its object improved means for enabling the operator to keep a moving object within the field of objective. Heretofore, in order to follow any object which moves either vertically or horizontally in a lateral direction while the cinematographic views are taken, vertical and horizontal panoramic platforms were used, which permit the whole apparatus to pivot on vertical or horizontal axis. This arrangement has numerous disadvantages among which that of being rough and irregular in operation on account of the heavy mass which must be moved and also that of producing a deformation of the angles and planes which causes a distortion of the background and scenery. The above disadvantages are removed with the improved arrangement which is the object of the present invention.

It has already been proposed in photographic apparatus to shift the objective out of center in order to avoid a deformation of the image.

According to the present invention, the objective is shifted out of center in a plane parallel to that of the image in order to follow up the vertical or lateral displacements of any object included in a cinematographic scene. The shifting of the exposure objective is accompanied by an identical shifting movement of the light guard, the shutter carrier and the finder objective. The mechanism used for that purpose must be so constructed that focusing can also be effected, which involves a simultaneous displacement of the exposure objective and finder objective along their respective optical axes.

In the annexed drawings which show by way of example a constructional form of the improved apparatus in accordance with the invention:

For the sake of simplicity, it has been assumed that the finder objective has the same focal distance as the exposure objective. It will be seen that its focal length might be different from that of the exposure objective provided that the displacements of the objectives be in the same ratio as their respective focal lengths, so that combinations having different focal lengths may be used for the exposure objective according to the requirements.

Figure 1:
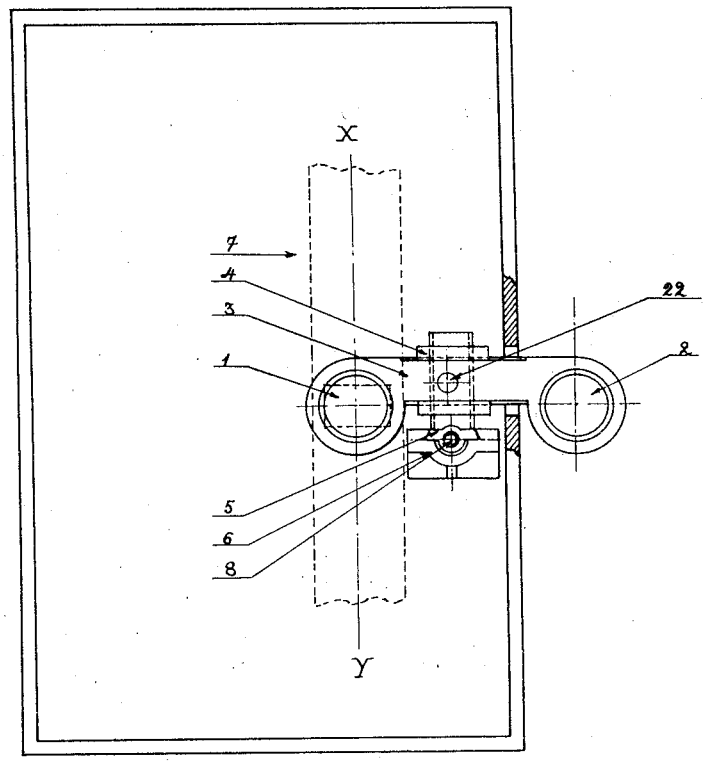
Figure 1 is a front elevation view, the closing board being removed and the parts which have no bearing with the invention being omitted.
Figure 2:
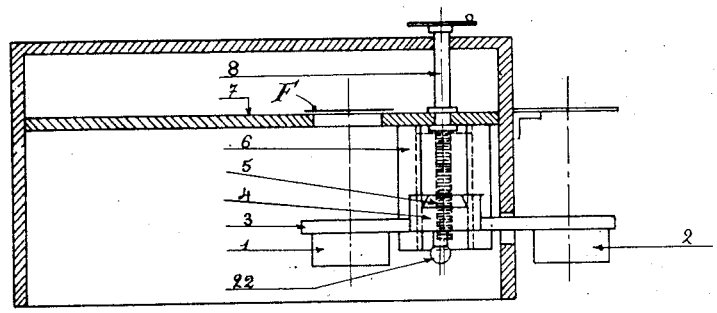
Fig. 2 is a horizontal section of the apparatus.
Figure 3:
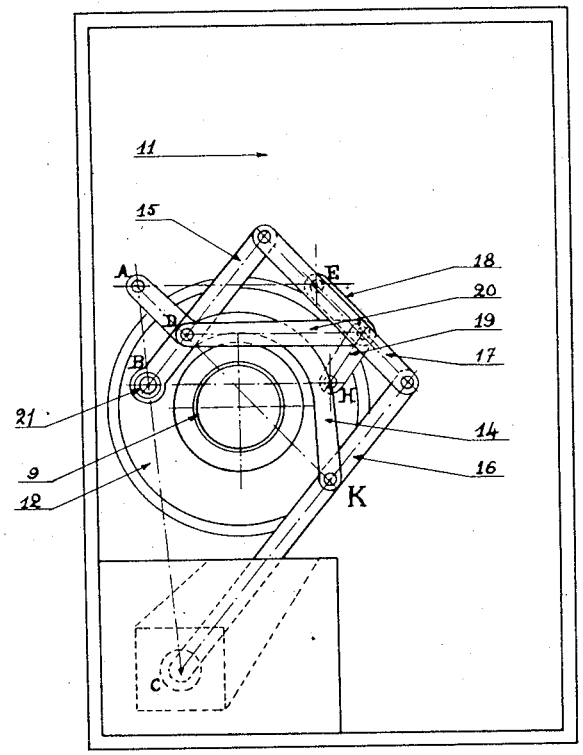
Fig. 3 is a rear view of the closing board and the mechanism fixed thereto.

X—Y denotes the longitudinal axis of the film F. The exposure objective 1 and the finder objective 2 are mounted on a cross member or objective carrier 3 which can move laterally in a slide 4 which latter is itself vertically movable along a post carried on the slide 5. The slide 5 can be displaced horizontally at right angles to the plane of Fig. 1, in a guide 6 secured to the partition 7 of the apparatus casing, by means of a screw 8 rotatably mounted in the partition 7 and carrying a nut secured to the slide 5. By actuating the screw 8 the focusing operation may be effected.

Figure 4:
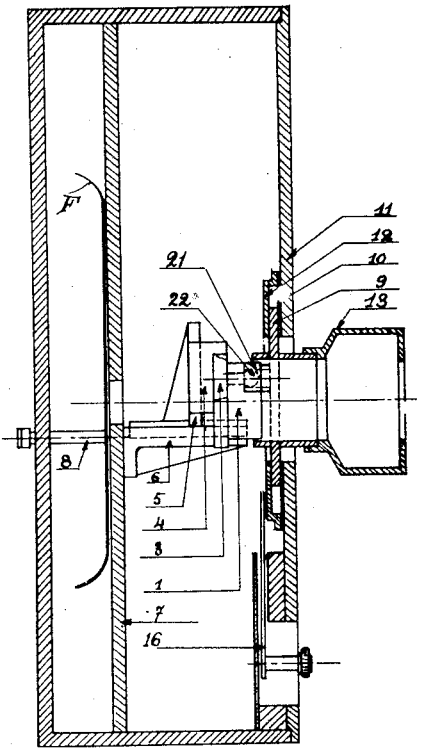
Fig. 4 is a vertical section along the line X—Y of Fig. 1, the apparatus being closed and the closing board in position.

In order to avoid the injurious influence of vibrations on the objective during exposure, the light guard 9 (Fig. 4) and shutter carrier 13 which might be fixed on the objective are preferably mounted independently from the same and carried by the closing board 11 of the apparatus. For this purpose, the light guard 9 is so mounted that it may slide between a friction plate 10 secured to the closing board 11 and a bridge member 12, the closing board being provided with an aperture of sufficient dimensions to allow the desired displacements of the light guard. The shutter carrier 13 is secured to the front part of the light guard.

According to the invention the objective carrier 3 and the light guard 9 with shutter carrier 13 are shifted in a plane parallel to that of the image by any suitable means during the exposure so as to keep the moving object within the field of the objectives and any suitable arrangement of screws or racks and pinions may for instance be provided for shifting the objective carrier 3, by actuating the objective carrier proper within the slide 4 and said slide 4 along the vertical post carried by the slide 5. Improved means are however provided according to the invention whereby the objective carrier and the light guard may be suitably actuated by means of an operating handle which the operator actuates with one hand, his other hand being used to turn the handle of the apparatus.

To the rear side of the closing board 11 of the apparatus, is pivotally mounted at a fixed point A a lever 14. To the said lever 14, is pivoted at D a lever 15 which is pivoted at one of its ends B, to a ball socket 21 carried by the light guard 9, while its other end is connected by a link 17 to a lever 16 parallel to the lever 15 and connected at K with the lever 14. The lever 16 carries at its free end at C the operating handle, the construction being such that the three points A. B. C and the three points A. D. K are on a straight line respectively. A spherical stud 22 secured to the objective carrier 3 is in engagement with the ball socket 21. Inasmuch as all the movements of the operating handle C are reproduced on a reduced scale by point B by means of the pantograph arrangement described, the operator watching on the ground glass of the finder the displacements of the moving object in the field is enabled to follow the movements of said object and keep the latter within the field at any moment by actuating the operating handle C with one hand. The same movements are transmitted to the light guard to which the ball socket 21 is secured and in order that the said light guard may move in parallelism with itself as well as the shutter carrier 13 secured to said light guard, a second point H of the light guard is caused to execute the same movements as point B, which is obtained by means of a link 19 pivoted at H to the light guard and parallel to the lever 15, said link being pivotally connected to point D of the lever 15 (by means of a link 20 parallel to the line B.—H) and to a fixed point E by means of a link 18.

It will be noted that the ball and socket joint used for coupling the light guard to the objective carrier permits of an easy removal of the closing board 11 which carries the light guard whereby the gears of the mechanism may be frequently inspected and the shutter of the apparatus may be easily adjusted.

Having now described my invention what I claim as new and desire to secure by Letters Patent is:

1. A cinematograph apparatus for taking views comprising in combination an objective, means for shifting said objective along its optical axis, and a pantograph connected to the objective and by means of which the latter may be displaced vertically and laterally in a plane at right angles to said optical axis according to the displacements of the object to be photographed.

2. A cinematograph apparatus for taking views comprising in combination an exposure objective, a finder objective, means for displacing said objectives in a direction parallel to their respective optical axes and means for simultaneously shifting both objectives in a plane normal to said direction according to the movements of the object to be photographed.

3. A cinematograph apparatus for taking views comprising in combination an exposure objective, a finder objective, means for displacing said objectives in direction parallel to their respective optical axes, a light guard, a shutter carrier and means for simultaneously shifting both objectives, the light guard and the shutter carrier in a plane normal to said direction according to the movements of the object to be photographed.

4. A cinematograph apparatus for taking views comprising in combination an exposure objective, a finder objective, an objective carrier upon which both of these objectives are mounted, a guide member for guiding said objective carrier in a direction parallel to the optical axes of the objectives, means for displacing the objective carrier in said guiding member, means for mounting the objective carrier on the guiding member so that the objective carrier may move in a plane normal to said direction while remaining parallel to itself, a stud on said carrier, an operating handle and a pantograph device connecting the operating handle to said stud.

5. A cinematograph apparatus for taking views comprising in combination an exposure objective, a finder objective, an objective carrier upon which both of these objectives are mounted, a guide member for guiding said objective carrier in a direction parallel to the optical axes of the objectives, means for displacing the objective carrier in said guiding member, means for mounting the objective carrier on the guiding member, so that the objective carrier may move in a plane normal to the said direction while remaining parallel to itself, a stud on said objective carrier, an operating handle, a pantograph device connecting the operating handle to said stud, a light guard, means for guiding said light guard in a plane normal to the optical axis of the apparatus, a shutter carrier mounted on said light guard, means for connecting one point of the light guard to the stud and means for causing the light guard to be displaced in parallelism to its own direction.

In testimony whereof I have signed my name to this specification in the presence of two subscribing witnesses.

LOUIS JANOT.

Witnesses:
ANTOINE LAVOIX,
JOHN F. SIMONS.